April 8, 1941.  H. L. BLUM  2,237,518
FLUID METER
Filed Aug. 27, 1937  4 Sheets-Sheet 2

Hosmer L. Blum
INVENTOR.

BY Edmund W. E. Kamm
ATTORNEY.

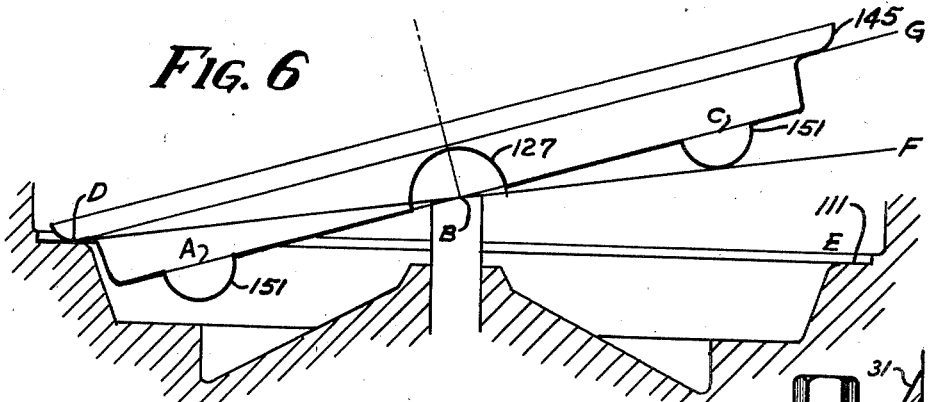
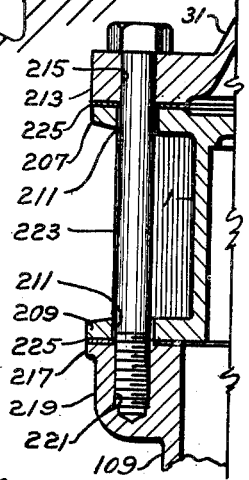
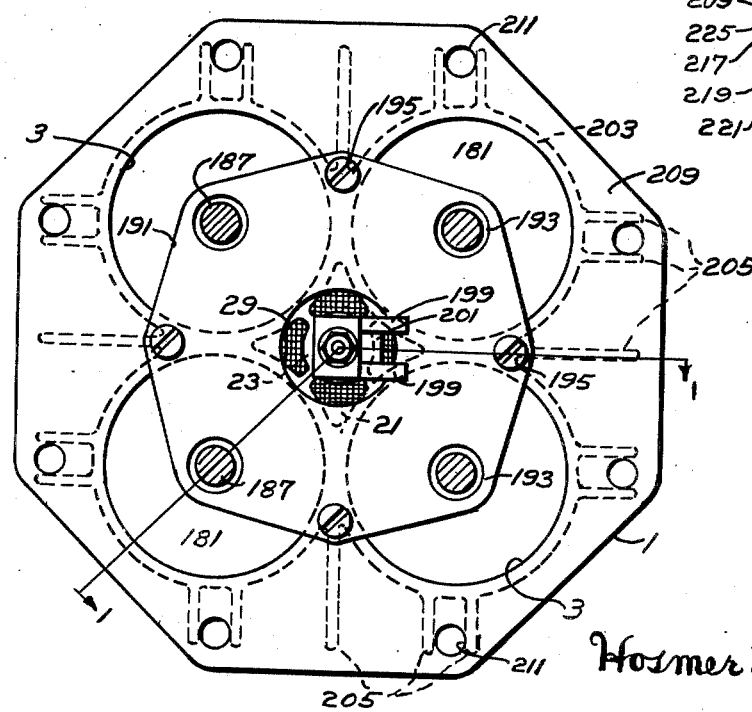

April 8, 1941. H. L. BLUM 2,237,518
FLUID METER
Filed Aug. 27, 1937 4 Sheets-Sheet 4

Hosmer L. Blum
INVENTOR.
BY Edmund W. E. Kamm
ATTORNEY.

Patented Apr. 8, 1941

2,237,518

UNITED STATES PATENT OFFICE 2,237,518

FLUID METER

Hosmer L. Blum, Fort Wayne, Ind.

Application August 27, 1937, Serial No. 161,222

18 Claims. (Cl. 74—60)

My invention relates to fluid meters of the positive displacement type and has for an object the provision of a meter which is cheaply built by reason of the reduction of necessary parts to a minimum, by reason of the simplicity of construction of the parts and by reason of the ease of assembly of the various parts into the complete unit.

Another object of my invention is the reduction in size of the fluid meter.

Yet another object of my invention is the reduction of mechanical and hydraulic friction to a minimum.

Still another object of my invention is to produce a meter having extreme accuracy of measurement with a low differential of inlet and outlet pressures.

A further object of my invention is to reduce the noise usually incident to operation of a meter.

Another object of my invention is to reduce the weight to a minimum without sacrificing strength or wearing qualities.

A further object of my invention is to provide a control plate which is formed to permit the alignment of the centers of all its bearings in one plane.

Another object of my invention is to provide a control plate having a rim portion which is offset from the web portion.

Another object of my invention is to provide piston rod bearings which guide the piston rods into proper seating relation therein.

Yet another object of my invention is to provide a piston retaining member for retaining the piston rods in the cylinders and within a predetermined degree of alignment with the axis of their respective cylinders.

Another object of my invention is to provide a cylinder block which is of minimum weight and maximum strength.

Still another object of my invention is to provide novel means for retaining the control plate in contact with its track.

Yet another object of my invention is to provide for passage of the liquid to be measured into the meter bowl while preventing passage of dirt and water.

Another object of my invention is to provide a free running valve which will not adhere to the valve seat plates and will thus reduce mechanical load or drag on the moving parts.

Still another object of my invention is to provide means for automatically aligning the various elements supported by the bowl and cylinder block when the valve crank and its driving member on the control plate are aligned and the bowl and cylinder block are brought together.

Other objects will be apparent from a study of the specification and the accompanying drawings of which Figure 1 is a vertical section taken on the line 1—1 of Figure 3 showing the various parts in assembled relation.

Figure 4 is a bottom view of the cylinder block showing the pistons, retainer and the crank and showing also the ribbed construction of the cylinder block.

Figure 5 is a section taken on the line 5—5 of Figure 2 showing the means for maintaining the bowl, cylinder block and cover in assembled relation.

Figure 6 is a somewhat diagrammatic view showing the relation of bearings, control plate and the track upon which the control plate runs.

Figure 1:
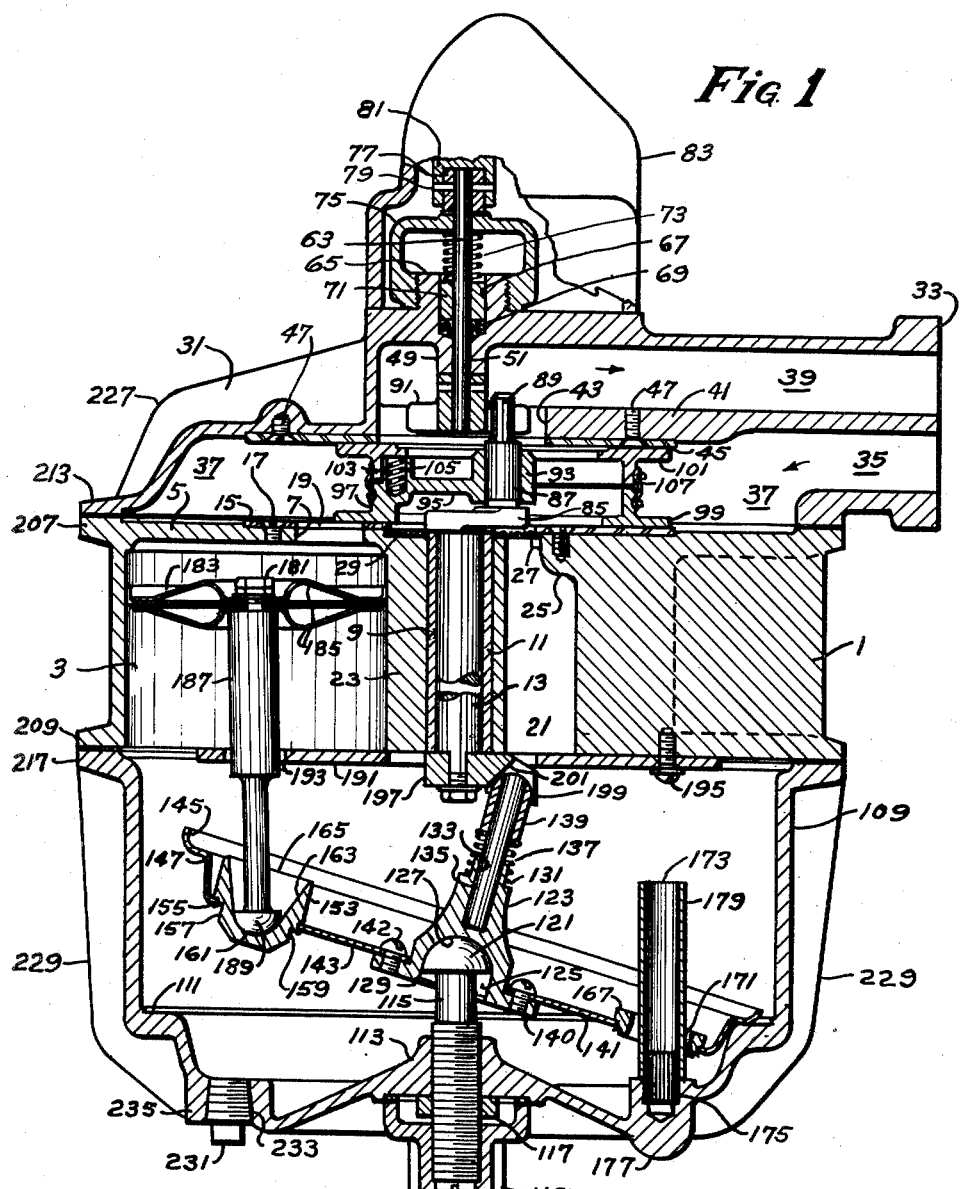

Referring to Figure 1, the numeral 1 indicates the cylinder block in which are formed preferably four cylinders 3 which are completely open downwardly but are closed by a head 5 at their upper ends. The head is perforated as at 7 to provide ports through which liquid enters and leaves the cylinders. The cylinders are equidistantly spaced both radially and circumferentially about the axis of a central opening 9 in the block.

The opening 9 is cylindrical and is provided with a bushing 11 of bronze or other suitable bearing material which is adapted to receive a crankshaft 13 described below.

Figure 2:
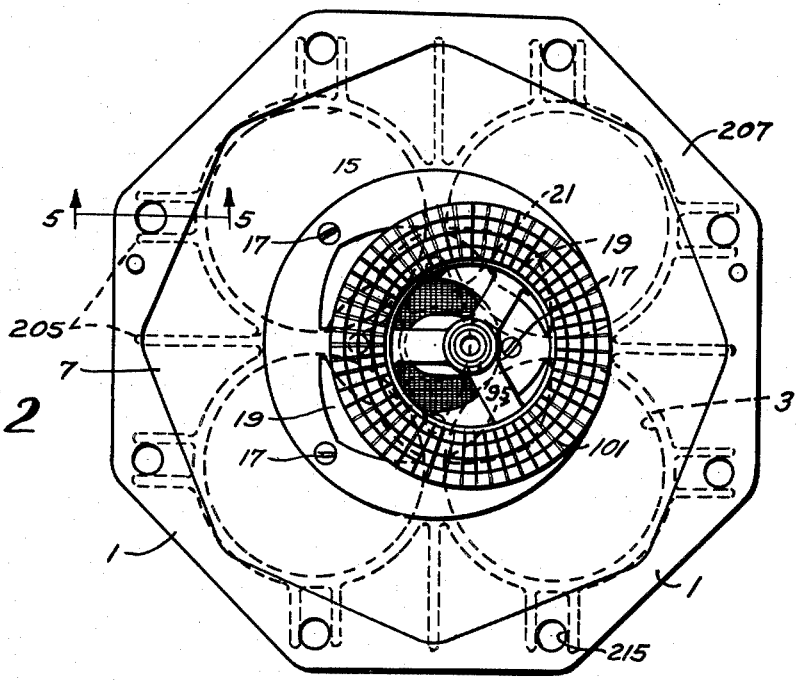
Figure 2 is a plan view of the cylinder block and valve mechanism as seen with the cover removed.
Figure 3:
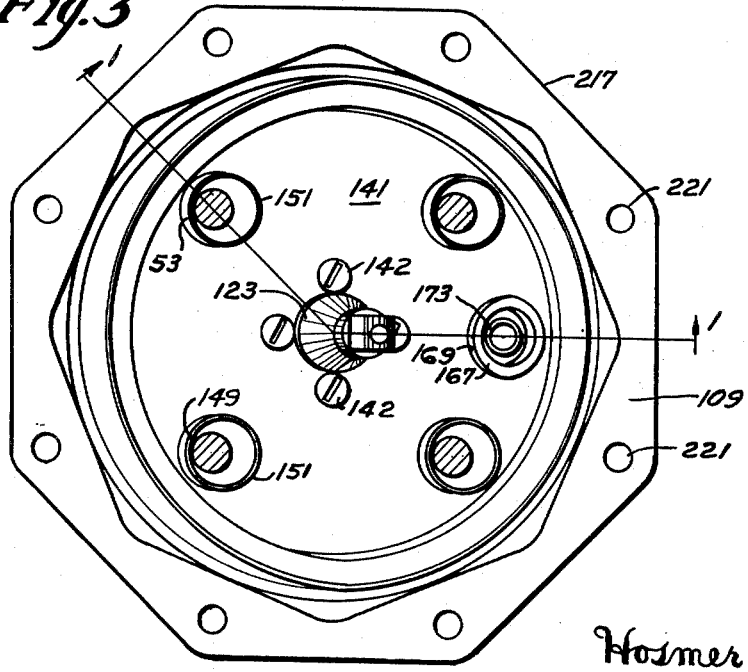
Figure 3 is plan view of the bowl and control mechanism.

A hardened and ported valve seat plate 15, which is preferably of non-corrosive character such as stainless steel is fixed to the head 5 in any suitable manner as by means of screws 17 and is provided with ports 19 (Figure 2) which are in alignment with the perforations 7 in the head. Said ports are formed to cooperate with a circular valve which moves in an orbital path as described below. The block is cored vertically as at 21 to provide openings therethrough while at the same time providing a centrally disposed hub 23 (see Figure 4) in which the opening 9 is formed. The openings are somewhat restricted at their upper ends by bosses 25 which are provided for the reception of screws 17 and by a radially extending flange 27 the upper face of which is somewhat below the plane of the lower face of the valve seat plate 15 but in same plane as the upper face of the hub 23.

An annular screen 29 fits around the end of bushing 11 which projects upwardly beyond the hub 23 and is clamped along its outer periphery between the valve seat plate 15 and the flange 27. The screen is of such fine mesh that it will prevent water from passing downward into the spaces 21 but it is not sufficiently fine to prevent the passage of the liquid to be measured such as gasoline. A cover indicated generally by the numeral 31 rests upon the upper portion of the cylinder block and is provided with a flange 33 by means of which the meter is connected with the dispensing line (not shown).

An inlet conduit 35 connects the flange with a chamber 37 formed by the cover and cylinder block while an outlet conduit 39 also connects the flange with the chamber 37. The two conduits are bounded by a common dividing wall 41 and communication between the outlet conduit 39 and chamber 37 is established through an opening 43 passing through the wall 41.

A downwardly facing valve seat plate 45 is fixed to the cover by means of screws 47 in a position parallel to and concentric with the lower valve seat plate 15. The plate 45 however, is not provided with ports but has a central opening.

The upper portion of the cover is provided with a downwardly directed boss 49 which is perforated as at 51 to provide a passage for the counter driving shaft 63. A boss 65 is arranged externally of the cover in axial alignment with the boss 49 and is counterbored as at 67 to receive packing 69 for the shaft 63 and a packing gland 71. A spring 73 is arranged so as to bear upon the gland and is confined by a packing nut 75 which threadedly engages the exterior surface of the boss.

A collar 77 fits on the end of shaft 63 and a pin 79 is received transversely of the shaft and is adapted to connect with a slotted member 81 of the counter mechanism indicated generally by the numeral 83 and which may be of any desired type such as the well known volume register or cost computing register.

A crank 85 is mounted at the upper end of the shaft 13 and is provided with a crank pin having a valve supporting portion 87 and a counter-driving portion 89. The latter is adapted to engage between an adjacent pair of teeth on a star wheel 91 which is pinned or otherwise fixed to the shaft 63.

The valve comprises a hub 93 having radial arms 95 which support an annular ring 97 which in turn is provided with a flange 99 having a finished surface adapted to engage the valve seat plate 15. The upper portion of the valve consists of a flanged annular ring 101, the flange of which is finished and engages the upper valve seat plate. Lugs 103 on the lower ring serve to retain the rings in axial alignment and springs 105 tend to maintain the flanges in pressure contact with their respective valve seat plates. A flexible sealing strip 107 is supported by wires or other suitable means to seal the joint between the rings.

It will be seen that the valve serves to divide the chamber 37 into two portions, one of which is external and the other of which is internal of the valve. The internal portion communicates with outlet channel 39 through the opening 43 in the upper valve seat plate.

The path of the valve is orbital so that the ports 19 will successively be alternately opened into the portion of chamber 37 externally of the valve and then to the portion of the chamber internally of the valve so that they will be alternately connected in succession with the inlet conduit 35 and with the outlet conduit 39 as the valve rotates.

The flanges of the valve rings are preferably ribbed both radially and circumferentially so as to form a multitude of closely adjacent depressions which serve to reduce the adhesion of the valve to the valve seat plates which would otherwise be present because of the intimate contact of accurate planar surfaces.

A bowl 109 which opens upwardly, is in contact with the lower portion of the cylinder block 1. The bowl has formed integrally therewith, an annular track 111. A centrally located boss 113 is centrally perforated and internally threaded to receive a threaded journal supporting stem 115. A lock nut 117 is threadedly received on the stem for locking it in adjusted position. A sealing cap 119 is also threadedly received on the stem to preclude unauthorized tampering with the adjustment of the journal.

The journal 121 is hemispherical and is undercut so that the hub 123 for the control plate may be formed with a bearing having a cylindrical portion 125 below the hemispherical bearing portion 127. The cylindrical portion is bevelled internally as at 129.

The hub 123 is elongated axially, formed with a shoulder 131 and bored axially at 133 to fixedly receive a shaft 135. A spring 137 fits over the boss and rests against the shoulder. A sleeve block 139 which is square in cross-section is mounted for both rotation and axial translation on the shaft and both sleeve and shaft are rounded at their free ends to form a cylindrical surface. Preferably the hub is of die cast material and the shaft 135 is cast therein as an insert. The hub 123 is formed with a flange 140 at its lower end which is drilled and tapped to receive screws 142 which serve to hold the control plate 141 on the hub.

The control plate 141 is preferably of pressed metal having a central radially extending web 143 and a rounded rim or tread portion 145 which is out of the plane of the web. The rim and web are joined by a substantially frusto-conical, upwardly diverging connecting flange 147. The web is perforated as at 149 near the flange 147 to receive bearings 151. The perforations are preferably four in number and are located equidistantly from the axis of hub 123 on the opposite ends of perpendicular intersecting diameters of the control plate.

Bearings 151 are formed with three concentric external cylindrical portions 153, 155 and 157 of successively decreasing diameters. The cylindrical portion 155 is undercut as at 159 so that when the bearing is inserted through perforation 149, the undercut portion 155 may be swedged outwardly so as to retain the bearing in position in the plate.

Each bearing is provided internally with a substantially hemispherical seat 161 near the bottom and a frusto-conical section 163 which joins the seat with an opening 165 of much larger diameter at the upper end of the bearing so that a journal later to be described will be readily guided into position on the seat 161.

A bearing member 167 is inserted in an opening 169 disposed intermediate of two of the perforations 149 and is fastened in a manner similar to that by which bearings 151 are fixed in the plate. The member 167 is perforated as at 171 and the internal surfaces are rounded axially so that continuous rolling contact may be established and maintained between the member 167 and a pin 173.

The pin 173 is preferably knurled for a short distance at one end and this end is pressed into an opening 175 in a boss 177. A sleeve 179 of plastic material such as "Formica" is slipped over the pin and is held in place thereon by the portion of the knurled end which is not received in the opening 175.

Pistons 181 made up of leathers 183 and backing discs 185 are assembled on piston rods 187. Hemispherical journals 189 are formed on the lower ends of the rods and are adapted to cooperate with the bearings 151 heretofore described.

A guide plate 191 having openings 193 therein is fixed by means of screws 195 or other suitable fastenings to the lower face of the cylinder block. The piston rods fit loosely in the openings 193 but the diameters of the openings and of the portions of the piston rods associated therewith are such that the centers of the journals 189 are always well within the openings 165 of the bearings 151.

The crank 197 is fixed to the lower end of the crank shaft 13 by means of a stud and nut or any other suitable fastening. The crank comprises a pair of arms 199 with an intervening upwardly inclined connecting portion 201 and these elements cooperate to receive the shaft 135 and sleeve 139. As is clearly shown in Figure 4, the cylinder block is cored out, leaving comparatively thin cylinder walls 203 and supporting webs 205 which lie between flanges 207 and 209 (Figures 1 and 5) which are provided with pairs of aligned openings 211. The cover 31 is provided with a flange 213 of the same size as flange 207 and this flange is perforated as at 215.

Similarly the bowl 109 is provided with a flange 217 which is adapted to mate with the flange 209 of the block and is provided with bosses 219 which are internally threaded as at 221 to receive tie bolts 223 which pass through the openings in the cover and block and hold these elements and the bowl in proper relation. Any desirable gasket material 225 may be provided to seal the joints between these elements.

The cover may be formed with reinforcing ribs 227 and the bowl may be provided with similar ribs 229. A drain plug 231 is also fitted into an opening 233 in a boss 235 of the bowl.

It has been found that by forming the control plate 141 into a dish or saucer shape, the centers of the radii of bearings 121 and 151 can be brought into a common plane. Thus as shown in Figure 6, the centers A, B, and C show on the same line in elevation. The rounded bead or rim of the control plate contacts the track 111 at a point D on a circle which shows as the line DG in elevation in Figure 6 while the plane of the track shows as the line DE. By designing the parts so that the angle formed by the line DG and a line DBF through the bearing 127 is equal to the angle formed by the line DE with the line DBF, it has been found that only one pin 173 need be employed to retain the control plate in proper angular position with respect to the pistons.

The meter is designed primarily for cheapness of construction so far as this is possible without sacrificing wearing qualities and accuracy. For this reason the block, cover and bowl are preferably of die cast construction.

For the same reason the bearings 151 and 127 are formed open so that assembly will be facilitated, it being necessary only to place the parts in proper relation with each other without the necessity of connecting them.

In assembling the meter, parts of which are described in detail above, the cover is fitted with the star wheel 91, shaft 63, the stuffing box, collar 77, pin 79, valve seat plate 45 and if desired with the counter 83 although this element may be attached at any suitable time.

Similarly the cylinder block 1 is fitted with the pistons which are held in place by the retaining plate 191. The bushing 11 is fitted in the central bore 9, the screen 29 is fitted over the bushing and the lower valve seat plate is fixed in place to hold the screen. The crank shaft 13 is inserted in the bushing and the lower crank 197 is fixed in place. The valve assembly is mounted on the upper crank.

The bowl assembly comprises the central stud 115 which is screwed in place, the pin 173 which is pressed into place and has the sleeve 179 pressed into place over the knurled portion and plug 231 which is also screwed in place.

The control plate assembly is made up by swedging the the bearings 151 and bushing 167 into place in the pressed member and mounting the member on the hub 123. The spring 137 and the sleeve block 139 are mounted on the shaft 135 which has been pressed into the hub. This sub-assembly is then placed with bushing 167 in position over stud 173 and with bearing 127 on journal 121.

When the cover assembly is placed on the cylinder block assembly which is provided with gasket 225, with openings 211 and 215 in alignment, the screws 223 may be dropped in place. Thereupon it is necessary merely to place a gasket on the bowl, raise the bowl and control plate assembly into engagement with the block being careful that the sleeve block enters the space between arms 199 of the lower crank with the rounded portion of the block in contact with the inclined surface 201 and engage the screws with the threaded openings 221 in the bowl. In drawing up the screws, the spring 137 will be compressed and the bead 145 of the control plate will be forced into yielding engagement with the track 111. No attention need be given to the relation of the bearings 151 and journals 189 since these will be automatically aligned by the stud 173 and the screws 223 and due to the bell shaped guide opening in the bearings the journals will come to rest in proper relation with respect to the bearings.

In operation, liquid enters passage 35 and chamber 37 outside of the valve and passes through the ports in the lower valve seat plate which are open outside of the valve and into the corresponding cylinders. The pistons therein are forced downwardly and transmit a thrust to the control plate 141 which is thereby forced to rotate on the track 111.

The sleeve block 139 will describe a circular path and will rotate the crank 85 and will cause the axis of the valve to move in a circular path. The crank relations are such that when any one of the pistons is in upper or lower dead center positions the corresponding port in the valve seat plate is substantially closed by the valve and such that as the upper dead center position is passed the valve moves so as to expose the port externally of the valve while as the lower dead center is passed the valve moves so as to expose the port internally of the valve. Thus the liquid being expelled will pass internally of the valve, through opening 43 in wall 41 and out through conduit 39.

During the initial few cycles of operation of the meter, the bowl 109 will be filled by liquid flowing through screen 29 and openings 21 into the bowl. The screen will however, prevent the passage of water and dirt into the bowl and will thus protect the moving parts therein against corrosion and abrasion. The liquid which thus enters the bowl is segregated from the flow of liquid passing through the meter although it is forced to circulate in the bowl by the action of the pistons. It thus furnishes constant lubrication for the working parts in the bowl.

The pin 173 counteracts any tendency of the control plate to creep about on the track and the sleeve 179 eliminates such noise as might be caused by the metal to metal contact between the pin and control plate.

Sleeve block 139 being pressed outwardly of hub 123 by spring 137 will maintain the control plate bead 145 in contact with the track 111 and will compensate for any inaccuracy in the depth of the bowl between the track 111 and flange 217 so that no great care need be taken in finishing these surfaces. It similarly compensates for any adjustment of journal 121.

Figure 7:
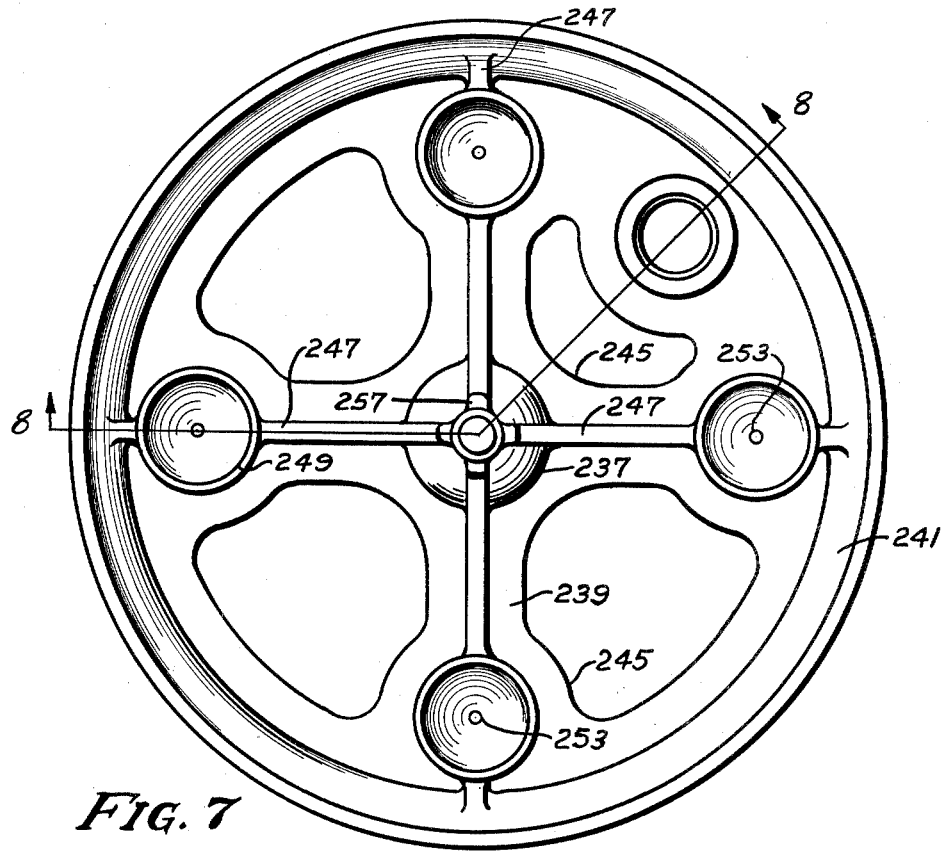
Figure 7 is a plan view of a modified form of control plate which is die cast.
Figure 8:
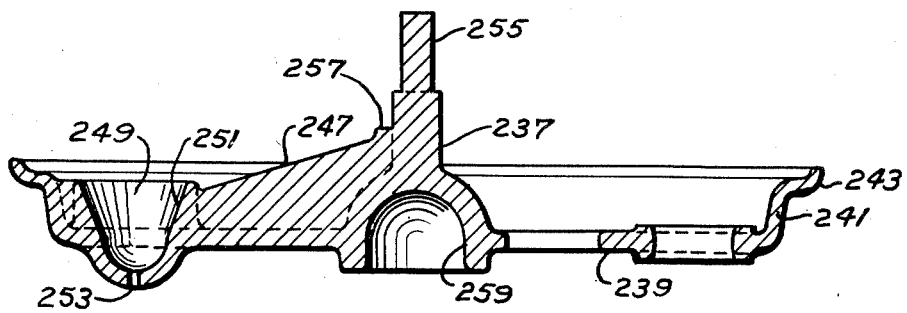
Figure 8 is an elevation of the control plate shown in Figure 7.

A modified form of control plate is shown in Figures 7 and 8. This form is die cast instead of being fabricated and has a hub 237, a web 239 extending radially therefrom, and terminating in a substantially axially directed rim 241 which is formed with a tread portion 243.

The web is cut away at 245 to lighten the structure and strengthening ribs 247 are provided between the hub and bearings 249 and between the latter and the rim 241.

The bearings are spherical and are provided with frustro-conical openings 251 which guide the piston rod journals into the bearings. Openings 253 are provided at the bottoms of the bearings to permit passage of liquid to and from the bearings for drainage and lubrication.

A portion 255 of reduced diameter is formed on the hub to receive the block 139 shown in Figure 1 while the webs are shouldered at 257 to afford a seat for the spring 137 which bears against the block. A spherical bearing 259 is formed in the lower portion of the hub to receive the supporting journal 121 (Figure 1).

It is apparent that various changes may be made in the form, arrangement and construction of the mechanisms here disclosed and the parts thereof without departing from the spirit of the invention, the scope of which is defined in the appended claims.

What applicant considers to be new and desires to protect by Letters Patent of the United States is:

1. In a fluid meter, means forming a circular track, a journal, means for supporting said journal centrally of said track, a circular control plate, means for supporting said plate on said journal for motion thereabout and in rolling relation with said track, so that the planes of said plate and track intersect, a single pin supported in fixed relation with respect to said track and engaging a bearing in said plate to prevent circumferential progression of said plate on said track, said pin comprising a noise reducing sheath.

2. In a fluid meter, a control assembly comprising a liquid retaining bowl, a circular track formed integrally therewith, a journal, means for supporting the journal in said bowl, a pin supported by said bowl, a control plate adapted to be supported by said journal for rolling contact with said track, said plate having a bearing adapted to receive said pin to prevent sliding of said plate with respect to said track, said pin having sufficient length to contact said bearing in any position of the plate.

3. In a fluid meter, a control plate comprising a central hub member, having a central bearing and a substantially radial flange, an element comprising a substantially radial web, a substantially axially directed flange at its outer circumference which terminates in a substantially radially outwardly extending and upwardly curved tread, a central perforation in said web adapted to receive said hub and means for fixing said web on said hub in abutting relation with said flange.

4. In a control plate for a fluid meter comprising a hub, a web extending from said hub and provided at its outer circumference with a bearing ring, said bearing ring having a rounded cross-section, bearing members formed in said web, and spaced about said hub.

5. In a fluid meter, a track, a control plate mounted on a central bearing, in inclined relation with respect to said track for rolling contact therewith, a hub extending axially from said control plate and having an elongated journal which revolves about an axis perpendicular to the track as the control plate rolls, a bifurcated crank having its axis of rotation in alignment with the axis of revolution of said journal, an inclined surface extending into the bifurcation facing the control plate and sloping downwardly and inwardly toward the axis of the crank, a block mounted for rotation and for axial translation on said journal and adapted to engage in said bifurcation and to abut said inclined surface, yieldable means for urging said block into engagement with said surface so as to hold the control plate in engagement with said track.

6. In a fluid meter, a track, a control plate mounted on a central bearing, in inclined relation with respect to said track for rolling contact therewith, a hub extending axially from said control plate and having an elongated journal which revolves about an axis perpendicular to the track as the control plate rolls, a bifurcated crank having its axis of rotation in alignment with the axis of revolution of said journal, an inclined surface extending into the bifurcation facing the control plate and sloping downwardly and inwardly toward the axis of the crank, a block mounted for rotation and for axial translation on said journal and having a semicylindrical end portion adapted to engage in said bifurcation and to abut said inclined surface, yieldable means for urging said surface so as to hold the control plate in engagement with said track.

7. In a control mechanism for a fluid meter, a hub, a web extending from the hub and provided with a tread, a journal on said hub extending substantially axially of said tread, a combined pressure block and power transmitting member mounted for translation on said journal and means for yieldably resisting translation of said bearing member.

8. In a control mechanism for a fluid meter, a hub, a web extending from said hub and provided with a tread portion, a journal on said hub extending substantially axially of said tread, a combined pressure block and power transmitting member mounted for translation on said journal, said block being of polygonal cross-section and having its outer end rounded.

9. In a control plate for a fluid meter, a hub, a spherical bearing in said hub opening in one direction, a sheet metal web member fixed to said hub, spherical bearing inserts individually mounted in said web, means associated with each of said bearing inserts forming a guide opening having walls converging toward said bearing and merging with the walls thereof.

10. In a fluid meter, a control assembly comprising a fluid retaining bowl, a circular planar track formed integrally with said bowl, a journal, means for adjustably supporting said journal in said bowl substantially transversely of the plane of the track, guide means, and means supporting said guide means to extend into said bowl and substantially parallel to said journal.

11. In a fluid meter, a cylinder block, pistons arranged in said block and having piston rods provided with end journals, means for preventing lateral motion of said piston rods beyond predetermined limits, a control plate having bearings, one for each journal, means for supporting said control plate with the bearings in cooperative relation with said journals, means on said control plate adapted to guide said journals into said bearings from any lateral position within said predetermined limits, said preventing means being independent of said control plate.

12. In a fluid meter, a cylinder block, pistons arranged in said block and having piston rods provided with end journals, piston rod guide means for preventing lateral motion of said piston rods beyond predetermined limits, a control plate having bearings, one for each journal, means for supporting said control plate with the bearings in cooperative relation with said journals, means on said control plate adapted to guide said journals into said bearings from any lateral position within said predetermined limits, said preventing means being independent of said control plate.

13. In a control plate for a fluid meter, a hub, a web extending laterally from said hub and a tread offset axially from and curving radially beyond said web in the direction of said offset, bearings formed in said control plate, said hub, web, tread and bearings being integrally cast.

14. In a fluid meter, a cylinder block, pistons arranged one in each cylinder thereof and provided with rods having journals thereon, a bowl adapted to be attached to said block and having a track, a control plate mounted in said bowl for rolling on said track, bearings, one for each piston rod journal, formed in said plate, retaining means mounted on said block and provided with perforations adapted to receive the piston rods and guide them to enter said bearings, and means in said bowl cooperating with the control plate to maintain the bearings in position to be entered by the piston rod journals when the bowl is attached to the block.

15. In a fluid meter, a cylinder block, pistons arranged in said block and having piston rods provided with end journals, a retainer element attached to said block and adapted to receive said piston rods and to prevent lateral motion of said piston rods beyond fixed limits, a control plate having bearings, one for each journal, means for supporting said control plate with the bearings in cooperative relation with said journals, means on said control plate adapted to guide said journals into said bearings from any position within said fixed limits.

16. In a fluid meter, a control plate comprising a central hub member, having a central bearing, an element comprising a substantially radial web connected to said hub member, a substantially axially directed flange at its outer circumference which terminates in a substantially radially outwardly extending tread, a plurality of perforations in said web circumferentially disposed about said hub member, bearing members adapted to fit into said openings and to be fixed in place therein.

17. In a control plate for a fluid meter comprising a hub, a web extending from said hub and provided at its outer circumference with a bearing ring, perforations in said web radially of said hub, bearing members each having an undercut reduced portion adapted to fit into said perforations, and to extend through the web, said extending undercut portion being spun outwardly to hold said bearing in place in the web.

18. In a fluid meter, a control assembly comprising a liquid retaining bowl, a circular track formed integrally therewith, a journal, means for supporting the journal in said bowl, a pin, means supporting said pin to project into said bowl, a control plate adapted to be supported by said journal for rolling contact with said track, said plate having a bearing adapted to receive said pin to prevent sliding of said plate with respect to said track, said pin having sufficient length to contact said bearing in any position of said plate.

HOSMER L. BLUM.